Aug. 14, 1928.

A. R. SMITH

LOCK

Filed Feb. 3, 1927

1,681,017

INVENTOR
Anthony R. Smith
BY
Richey & Watts
ATTORNEYS

Patented Aug. 14, 1928.

1,681,017

UNITED STATES PATENT OFFICE.

ANTHONY R. SMITH, OF ELYRIA, OHIO, ASSIGNOR TO THE ELYRIA IRON AND STEEL COMPANY, OF CLEVELAND, OHIO, A CORPORATION OF OHIO.

LOCK.

Application filed February 3, 1927. Serial No. 165,514.

This invention relates to locks for preventing the unauthorized shifting of gears of automobiles and the like, and is particularly concerned with such locks which have means for interrupting the electrical ignition circuit.

In mechanism of the type described which has been manufactured heretofore, one general class accomplishes the locking by some means which prevents movement of the shifting levers. Another class of devices brings about a similar result by disengaging an element from contact with the gear means. My invention relates to the devices of the latter class but is free from many of the disadvantages of that class including the danger of not returning the disconnectible elements to engagement with the gear means at the proper place.

By my invention the disconnectible member is withdrawn from the gear when the gears are in neutral position and all danger of returning the disconnectible element to any position other than the neutral position of the gears is prevented by positive means thus ensuring against accidental stripping of the gears or jamming of the gear means in extreme cases so as to make the device incapable of use. Moreover since the lever is freely movable when the device is in locked condition, the locking means cannot be bent or broken by the application of force to the lever as may be possible with levers which are held in a fixed position when locked.

I am also enabled by my invention to provide an additional lock for an automobile or other apparatus equipped with my lever lock and employing an electric current. In the embodiment shown herein this additional lock comprises means for breaking the electric circuit coincident with disengagement of the gear engaging plunger with the gear means. Thus when an automobile, for example, equipped with my device is locked, the gear shift lever is disconnected from and incapable of moving the gears out of neutral position and the ignition circuit is also broken.

In the accompanying specifications in which I have illustrated and described in detail, one form of apparatus embodying my invention and in which—

Figure 1:
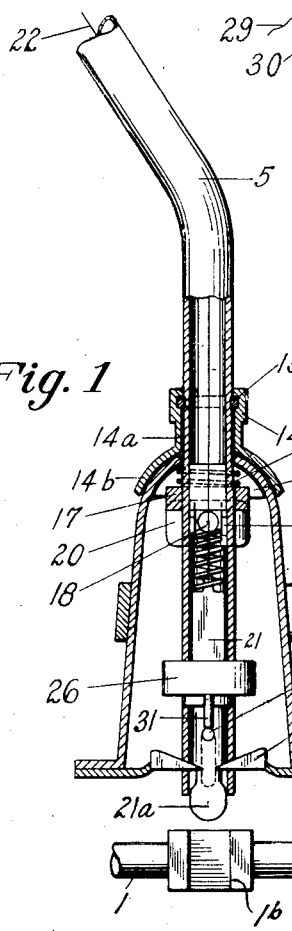
Fig. 1 is a side elevation, partly in section, of a device embodying my invention and—
Figure 5:
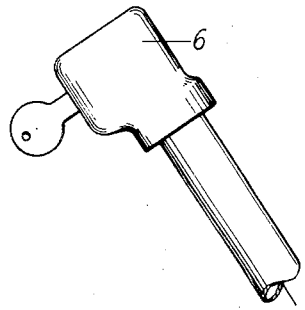
Fig. 5 is a horizontal view partly in section showing the circuit making and breaking means embodying a part of my invention and—
Figure 6:
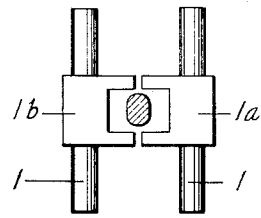
Fig. 6 is a fragmentary top plan view of the plunger in assembled position with the gear shifting rods.

The form of device illustrated herein and embodying my invention is a gear shifting mechanism for an automobile the gear being one suitably carried in a gear box (not shown) upon which box a housing for the lever is supported. This housing comprises a plate 2, resting on the gear box and an elongated tubular member 3 resting on member 2 and carrying a bracket 4 riveted or otherwise suitably secured to the exterior thereof for the purpose of supporting the brake rod or the like, this member 4 not being essential to my invention but merely being shown as an article of standard equipment.

A shifting lever 5, composed in this case of metal tubing is provided at its upper end with a knob 6 having a laterally extending recess 7 formed to receive a cylinder lock 8, which carries at its inner end an extension pin 9, to engage in a slot 10, of a plunger 11, which is reciprocably mounted to slide in the lever 5 upon movement of the pin 9 as by a key 12, for a purpose presently to appear.

The lever 5 is supported in its proper position relative to the casing 3, by means which permit the lever to have a universal movement after the manner of the ordinary gear shifting lever. As illustrated, this means includes the following elements: A split collar 13, is fitted into an annular recess formed in the outer surface of lever 5. A pair of semi-circular members 14 are provided with a tubular portion 14—a, seating at one end underneath the split washer 13 and having at the other end a flange 14—b shaped to form part of the ball and socket joint. The inner surface of the flanges 14—b resting, when the device is assembled, on the semi-spherically shaped top of the member 3. Disposed within the curved upper end of the member 3 and cooperating therewith is a similarly shaped shell member 15 which surrounds the lever 5 and is pressed against the member 3 by a spring 16 which is carried by a collar 17 which slides freely on the lever 5 and when assembled, rests on a pin 18 which extends through the lever 5. The ends of this pin 18 are mounted for sliding movement in one plane and rotational movement in the plane at right angles thereto between parallel guide flanges 19 carried on plate 20 secured to opposite sides of member 3. It will be understood that universal movement of the lever 5 is permitted by members 14, 15, 18 and 20, while movement of the lever 5 lengthwise relative to the member 3 is prevented in one direction by the members 13 and 14 and in the other direction by members 15, 16, 17, and 18.

A gear engaging plunger 21 is provided in lever 5. This plunger 21 is connected to plunger 11 by a wire 22 or other suitable means and is urged downwardly into its lowermost position as shown in Fig. 2, by a coil spring 23, compressed between the pin 18 and the end thereof. The plunger 21 is faced off on opposite sides as shown at 21a to engage operatively with the gear means 1 and controllably to clear either gear fork 1a or 1b when in the position shown in Fig. 2. When in that position, the gear means 1 may be shifted after the ordinary fashion, the lever 5 during such shifting, moving in a slot in plate 2, sufficiently long and wide to permit the necessary movement of the lever therein. This plate 2 is also provided with opening 24a, therethrough to permit the pin 24 carried by plunger 21 to move up through the plate when the plunger 21 is retracted into its disconnected and inaccessible position as shown in Fig. 1, this retraction being accomplished by turning the key 12 in the upper end of the lever 5 and moving the plunger 11 and wire 22 longitudinally of the lever while compressing the spring 23.

Figure 2:
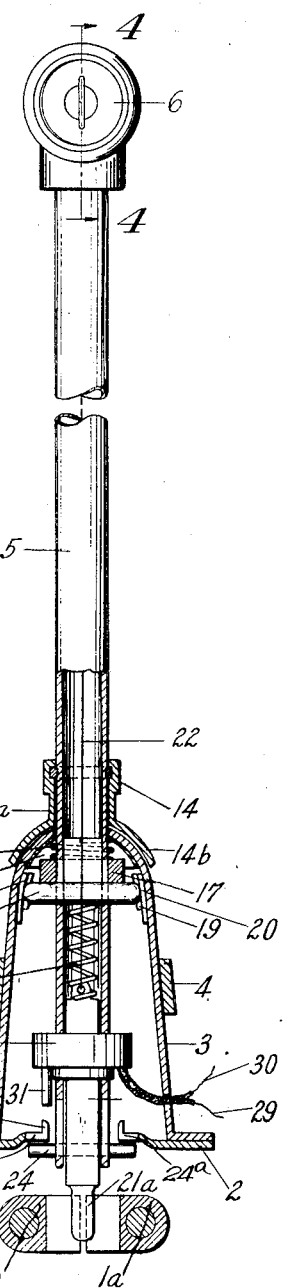
Fig. 2 is a similar view taken at right angles to that of Fig. 1 and—
Figure 3:
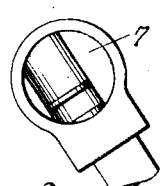
Fig. 3 is a side elevation of the lock carrying knob showing the lock cavity and the plunger associated with the lock in the upper end of the lever and—
Figure 4:
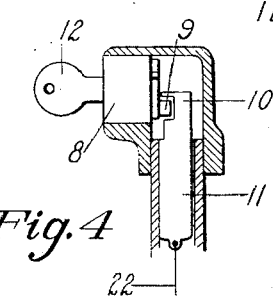
Fig. 4 is a sectional view taken approximately on line 4—4 of Fig. 2, but showing in elevation, the lock and the plunger in an unlocked position.

When the plunger 21 is in the position shown in Fig. 1, the gear means 1 can neither be shifted nor tampered with so far as the gear shifting mechanism is concerned. It is essential however, to provide means for ensuring the proper return of the plunger 21 to be placed in the gear means 1 from which it was removed during the locking. The means herein disclosed for such purpose consist or include upstanding flanges 25, formed integrally with the plate 2, these flanges each rising from the edge of the slot through which the pin 24 passes and being provided with slots 24a for the pin 24. In Figs. 1 and 2, these slots 24a extend upward divergingly. When the plunger 21 is in the disconnected and inaccessible position of Fig. 1, the pin 24 does not contact with the flanges 25 but on the contrary permits substantially all the ordinary movements of the lever 5. When the spring 23 is permitted to restore the plunger 21 to its connected position with the gear means 1, the pin 24 in its downward movement engages with the sloping surfaces grooves 24a of guides 25 and thus passes through the opening provided therefor in plate 2, meanwhile restoring the lever 5 to the predetermined position necessitated by the slot in the fixed member 2 through which the pin 24 must pass when moving in either direction. Any rotation of plunger 21 is thus prevented which insures proper disposition of the flattened sides 21a of the plunger in gear means 1.

A circuit maker and breaker is shown, comprising a casing 26 carried by the tubular part of lever 5 near its lower end within housing 3. Within the casing 26 are located two electric terminals 27 and 28 normally contacting with each other and forming a part of the ignition circuit from the battery, generator or the like (not shown) through wires 29 and 30 to the spark plugs (not shown). A movable pin 31 extends through the casing 26 and is engaged by pin 24 near the upper end of its stroke and its head which is composed of electrical insulating material is thereby moved against one terminal 27 to separate terminals 27 and 28. When pin 24 moves down with plunger 21 as the latter is becoming engaged with gear means 1, the terminal 27 springs back into place and contact with terminal 28 is had.

It will thus be evident that the ignition circuit is broken coincident with disengagement of the gear means and gear shifting means and that the single act of turning the key 12 results in doubly locking the automobile or other apparatus with which the invention is being employed.

It will be understood that the ordinary dash ignition switch is not dispensed with but is, on the contrary, preferred so that, for example the ignition circuit, may be broken without requiring locking of the gear shifting mechanism.

It will thus be seen that I have provided a gear shifting member which may be disconnected from the gear means and positively and definitely returned to exactly the same position automatically and that during the time the said member is in disconnected position the shifting lever is capable of all its ordinary movements and motions without the interposition thereby of any breaking stresses being imposed upon locking parts of the mechanism. It obviously follows that the locking device cannot readily be broken when in locked position nor the plunger 21 returned to gear shifting engagement with the gear means 1 even though the members 14 are removed by an unauthorized person as by removal of the cap 14c which assists in maintaining the parts in assembled position of the lever 5.

Having thus described one embodiment of my invention, what I desire to secure by Letters Patent is defined in what is claimed.

What is claimed is:

1. In mechanism for shifting gears in automobiles and the like, the combination of gear means, a shifting lever having a member connectible with and disconnectible from the said gear means when the lever is in a predetermined position, means for locking the said member in a disconnected and inaccessible position, and means for returning the lever to the predetermined position and the said member to connected position with the gear means.

2. In mechanism for shifting gears of automobiles and the like, the combination of gear means, a shifting lever having a member connectible with and disconnectible from said gear means when the lever is in a predetermined position, means for locking the said member in a disconnected and inaccessible position while permitting ordinary movement of the lever, and means for returning the lever to and maintaining it in the predetermined position while restoring the said members to connected position with the gear means.

3. In mechanism for shifting gears in automobiles and the like, the combination of gear means, a shifting lever having a member connectible with and disconnectible from the gear means when the lever is in a predetermined position, means for locking the said member in a disconnected and inaccessible position, means to return the said member to connected position, and means operable during such return to restore the lever to the predetermined position.

4. The combination set forth in claim 3 in which cooperating guide means are employed during return of the said member to connected position operable to restore the lever to the predetermined position.

5. In a mechanism for shifting gears of automobiles and the like, the combination of gear means to be shifted, a shifting lever therefor having a member connectible with or disconnectible from the gear means, means in the lever for moving the said member to and maintaining it in either a disconnected and inaccessible position or in a connected position with respect to the said gear means and means for returning the lever to and maintaining it in a predetermined position while the said member is being returned to its connected position.

6. In a mechanism for shifting gears of automobiles and the like, the combination of gear means, a hollow shifting lever provided with a gear engaging plunger in one end movable into and out of engagement with the said gear means, a pin carried by the plunger and extending through guide slots in the said lever, a fixed guide cooperating with the said pin in certain positions of the latter, a lock engaging plunger in the opposite end of the lever operatively connected to the first said plunger to move the same into disconnected and inaccessible position with respect to the said gear means and means for moving said plungers in the opposite direction when released by the said lock.

7. Gear shifting mechanism for automobiles and the like having a hollow shifting lever provided with an element disconnectible when in a predetermined connected position, means for locking the said element in a disconnected and inaccessible position, and means to guide the disconnectible element in its return to the said predetermind connected position.

8. Gear shifting mechanism for automobiles and the like having a hollow shifting lever provided with a disconnectible element, means for locking the said element in a disconnected and inaccessible position, and means to guide the disconnectible element in its return to a connected position, said last mentioned means including a fixed slotted member and a projection carried by the said element and movable in the slotted member.

9. In mechanism for shifting gears in automobiles and the like, the combination of gear means, a shifting lever having a member connectible with and disconnectible from the said gear means when the lever is in a predetermined position, means for locking the said member in a disconnected and inaccessible position, and means operable coincident with movement of the said member when the lever is in said predetermined position to break or make an electrical circuit.

10. In a mechanism for shifting gears of automobiles and the like, the combination of gear means, a hollow shifting lever provided with a gear engaging plunger in one end movable into and out of engagement with the said gear means, a pin carried by the plunger and extending through guide slots in the said lever, a fixed guide cooperating with the said pin in certain positions of the latter, a switch carried by said lever including terminals constituting parts of an ignition circuit and a breaker actuated by said pin to break the contact of the terminals.

11. Gear shifting mechanism for automobiles and the like having a hollow shifting lever provided with a disconnectible element, an electric switch actuated by the said element when in the disconnected position to break an ignition circuit, means for locking the said element in a disconnected and inaccessible position, and means to guide the disconnectible element in its return to a connected position.

12. Gear shifting mechanism for automobiles and the like having a hollow shifting lever provided with a disconnectible element, means for locking the said element in a disconnected and inaccessible position, means to guide the disconnectible element in its return to a connected position, and an ignition circuit switch carried by the said hollow member and actuated by the said projection, said last mentioned means including a fixed slotted member and a projection carried by the said element and movable in the slotted member.

13. In mechanism for shifting gears in automobiles and the like, the combination of gear means, a shifting lever having a member connectible with and disconnectible from the gear means when the lever is in a predetermined position, means at the upper end of the shifting lever for disconnecting the said member from the said gear means and locking it in a disconnected position, means controlled by the said means at the upper end of the shifting lever for moving the said member to connected position with respect to the said gear means, and means cooperating with the said member to guide the same into the predetermined position.

14. Gear shifting mechanism for automobiles and the like having a shifting lever provided with an element disconnectible and connectible with respect to gear means of the automobile, means for locking said element in a disconnected and inaccessible position, and an electric switch actuated by the said element when in the disconnected position to break an electric circuit.

15. Automobile gear shifting apparatus comprising gear shifting means, a housing, a gear shifting lever mounted in the housing for pivoted movement at all times, an ignition circuit switch within the confines of the housing and operatively associated with said lever in all positions of the latter, and means operable from near the upper end of the lever for controlling movement of the said gear shifting means and opening and closing of the switch.

16. Automobile gear shifting apparatus comprising gear shifting means, a housing, a gear shifting lever pivoted in the housing and engageable with said gear shifting means, an electrical switch within the confines of said housing, and means disposed near the upper end of the lever for controlling the locking of the gear shifting means and the opening of the switch, the said lever being pivotally movable in the housing when the gear shifting means is locked and the switch is open.

17. Automobile gear shifting apparatus comprising gear shifting means, a housing, a gear shifting lever pivotally mounted therein and having a member connectible with and disconnectible from said gear shifting means, an electrical switch enclosed within the confines of said housing and operatively associated with the said member, and means disposed near the upper end of said lever for locking said member in a disconnected position and said switch in an open position.

18. Automobile gear shifting apparatus comprising gear shifting means, a housing, a lever pivoted in the housing and operatively associated with the said means, an ignition circuit switch enclosed within the confines of the housing, a handle on the upper end of the lever, a lock in the handle and means reciprocable in the lever and controlled from the said lock for simultaneously preventing shifting of the said gear means by the lever and for opening the ignition switch.

19. Automobile gear shifting apparatus comprising a gear shifting lever provided with a disconnectible element, an electric switch actuated into open position by said element when the latter is moved into disconnected position and means for locking said element in disconnected position and said switch in open position.

20. Automobile gear shifting apparatus comprising gear shifting means, a housing, a lever pivotally mounted in the housing and having operative engagement at its lower end with said gear shifting means, an electrical switch enclosed within the confines of the housing, and means controlled from the upper end of the said lever and reciprocable relative to the lever for actuating said switch and controlling actuation of the gear shifting means.

In testimony whereof I hereunto affix my signature this 31st day of January, 1927.

ANTHONY R. SMITH.